(12) United States Patent
Norris et al.

(10) Patent No.: US 6,296,093 B1
(45) Date of Patent: Oct. 2, 2001

(54) VIBRATION-DAMPED MACHINE AND CONTROL METHOD THEREFOR

(75) Inventors: Mark A. Norris, Apex; Andrew D. Meyers, Raleigh, both of NC (US); Donald L. Margolis, El Macero, CA (US)

(73) Assignee: Lord Corportion, Cary, NC (US)

( * ) Notice: Subject to any disclaimer, the term of this patent is extended or adjusted under 35 U.S.C. 154(b) by 0 days.

(21) Appl. No.: 09/188,654

(22) Filed: Nov. 9, 1998

(51) Int. Cl.[7] .................................................. F16F 7/10
(52) U.S. Cl. ........................................ 188/378; 267/136
(58) Field of Search ................... 267/136, 140.14, 267/140.15; 188/378, 379, 380; 901/16

(56) References Cited

U.S. PATENT DOCUMENTS

| | | | |
|---|---|---|---|
| 3,483,951 | 12/1969 | Bonesho et al. | 188/1 |
| 3,836,098 | 9/1974 | Miyashita | 244/17.25 |
| 3,917,246 | 11/1975 | Gartner et al. | 267/136 |
| 4,083,433 | 4/1978 | Geohegan, Jr. et al. | 188/1 B |
| 4,483,425 | 11/1984 | Newman | 188/378 |
| 4,635,892 | 1/1987 | Baker | 248/550 |
| 4,694,650 | 9/1987 | Vincent | 60/520 |
| 4,715,559 | 12/1987 | Fuller | 244/1 N |
| 4,795,123 | 1/1989 | Forward et al. | 248/550 |
| 5,049,797 | 9/1991 | Phillips | 318/568.16 |
| 5,102,289 | 4/1992 | Yokoshima et al. | 414/744.2 |
| 5,156,370 | 10/1992 | Silcox et al. | 248/550 |
| 5,170,104 | * 12/1992 | Laughlin | 318/135 |
| 5,209,326 | 5/1993 | Harper | 188/378 |
| 5,231,336 | * 7/1993 | van Namen | 318/128 |
| 5,251,863 | 10/1993 | Gossman et al. | 248/550 |
| 5,332,061 | 7/1994 | Majeed et al. | 180/312 |
| 5,333,819 | 8/1994 | Stetson, Jr. | 244/164 |
| 5,551,650 | 9/1996 | Southward et al. | 244/54 |
| 5,564,537 | 10/1996 | Shoureshi | 188/380 |
| 5,613,009 | 3/1997 | Miyazaki et al. | 381/71 |
| 5,621,656 | 4/1997 | Langley | 364/508 |
| 6,032,558 | * 3/2000 | Michler | 83/74 |

OTHER PUBLICATIONS

De Fonseca, Van Brussel, Sas, *Active Vibration Control of High Speed Machine Tools*, Advanced Computational Methods in Engineering, pp. 569–578, Sep. 1998.

Montgomery, Kenny, Ghosh, Shenhar, *Evaluation of Inertial Devices For The Control Of Large, Flexible, Space–Based Telerobotic Arms*, Nasa Langley Research Center, Fifth Nasa/DOD Controls–Structures Interaction Technology Conference, U.S. Department of Commerce, National Technical Information Service, N93–18818, pp. 289–301, 1993.

Book and Lee, *Vibration Control Of A Large Flexible Manipulator By A Small Robotic Arm*, Proceedings of the 1989 American Control Conference, pp. 1377–1380, Jun. 21–23, 1989.

Futami, Kyura and Hara, *Vibration Absorption Control Of Industrial Robots By Acceleration Feedback*, IEEE Transactions On Industrial Electronics, vol. IE–30, No. 3, pp 299–305, Aug. 1983.

* cited by examiner

Primary Examiner—Robert J. Oberleitner
Assistant Examiner—Xuan Lan Nguyen
(74) Attorney, Agent, or Firm—Randall S. Wayland (57) ABSTRACT

A vibration-damped machine and method including beam being capable of gross movements in space relative to a stationary frame, means including a motor for causing the beam's gross movements; the gross movements tending to induce vibration into the beam, sensors for providing a signal representative of the induced beam vibration, an linear-acting inertial actuator mounted to the beam, and control means for receiving the signal and generating an output signal to actively drive the linear-acting inertial actuator at the appropriate phase, frequency and magnitude to damp induced beam vibrations. Embodiments of the vibration-damped machine are illustrated for a gantry robot, a horizontal machining center, an adhesive dispenser and a pivoting robot. The linear-acting inertial actuator is preferably controlled according to an inertial damping control method where the actuator is forced to behave as a damper attached to ground.

16 Claims, 8 Drawing Sheets

VIBRATION-DAMPED MACHINE AND CONTROL METHOD THEREFOR

FIELD OF THE INVENTION

This invention relates to the area of active vibration control systems, and more particularly, to methods for reducing vibration in machines.

BACKGROUND OF THE INVENTION

Many machines with moving components are subject to vibration. For example, when a machine including a cantilevered beam moveable in space relative to a stationary frame (such as a gantry robot) is abruptly stopped and started, the beam will undergo transient vibrations due to its inertia and inherent flexibility. In cases where there is a machine tool mounted on the beam for performing useful work, vibration of the beam can be translated into unwanted vibration of the machine tool. This, of course, may be translated into poor work quality and/or having to slow the manufacturing process to allow time for such transient vibrations to settle.

Various methods have been used in an attempt to reduce vibration in machines having moveable components, such as robots. For example, joint sensors have been used to determine position and overshoot of the various drive motors and thereby the position and overshoot of robot arms. The drive motors are then appropriately driven by a feedback control method to attempt to minimize system vibration. Such systems which attempt to control vibration via actuation of the drive motors tend to be costly. Generally, this is because in order to achieve the responsiveness needed, very costly drive motors must be utilized. Moreover, these systems may not very effective because the response of the motors, in many cases, is not sufficient to control transient overshoot vibrations. Moreover, such systems may tend to wear significantly over time.

Several prior references are generally directed towards inertial actuators and controlling vibration in pipes or machines. For example, U.S. Pat. No. 5,209,326 to Harper entitled "Active Vibration Control" teaches attaching inertial actuators to a pipe 23 to control vibration caused by a vibrating diesel engine in communication with the pipe. The control utilized is a feedforward algorithm that takes a signal 31 from the diesel engine and signals from sensors 27, 28 to produce output signals to drive inertial actuators 15. U.S. Pat. No. 5,251,863 to Gossman et al. entitled "Active Force Cancellation System" teaches a system for controlling vibrations in machines whereby an inertial actuator 4 is secured to a flexible foundation 3, collocated with a sensor 5, and aligned along the line of action of the disturbance (the vibrating machinery 1). U.S. Pat. No. to Stetson entitled "Self Tuning Motion/Vibration Supression System" teaches a sensor 32 and proof mass actuator 52 preferably collocated on a mast 26. The proof mass actuator 52 is vibrated according to an "integrated motion energy signal" to maintain the integrated signal of the mast at a minimum. U.S. Pat. No. to Forward et al. describes "Wideband Electromagnetic Damping Of Vibrating Structures." The system includes a sensor 201 for sensing vibration of the structure, a control system 202 and an inertial driver 203 for providing damping forces to damp vibration in the structure. The control utilizes the sum of velocity and acceleration as feedback. Accordingly, none of the above-mentioned patents are directed to systems where the vibrating component undergoes gross motions and transient vibrations resulting therefrom. U.S. Pat. No. 5,102,289 to Yokoshima et al. entitled "Damper Device For Precision Assembling Robot" teaches attaching a passive damper device at the end of the robot arm to absorb vibrations thereof. This systems however, is only effective at a singular frequency and is therefor inefficient in systems where the arm length changes. Moreover, even in systems with unchangeable length arms, the natural frequency of the system can change when the position of the tip of the arm moves in space. A paper given at the Fifth NASA/DOD Controls-Structures Interaction Technology Conference by Raymond Montgomery et al. entitled "Evaluation of Inertial Devices for the Control of Large, Flexible, Space-based Telerobotic Arms," 1993, describes a system for controlling robot arm vibration by controlling a torque wheel having a reaction mass rotatably mounted thereon. However, such torque motors tend to be expensive, require sophisticated controls, and have a tendency to wear when subjected to such constantly reversing loading.

Therefore, there is a long felt, and unmet, need for a simple, rugged and cost effective vibration-damped machine and method where such machines include a beam moving in space relative to a stationary frame, thereby desirably increasing quality and/or manufacturing throughput.

SUMMARY OF THE INVENTION

In light of the advantages and drawbacks of the prior art, the present invention is a vibration-damped machine and method therefor. More particularly, the vibration-damped machine comprises a beam, such as a cantilever beam, being capable of gross movements in space relative to a stationary frame, means including a motor for causing the beam's gross movements in at least one direction; the gross movements tending to induce vibration into the beam, sensor means for providing at least one signal representative of the induced beam vibration, at least one beam mounted inertial actuator, and control means for receiving the signal and generating an output signal thereby actively driving the linear-acting inertial actuator at the appropriate phase, frequency and magnitude to damp the beam's induced vibration. In several embodiments, it is most preferable to mount both the work member and the linear-acting inertial actuator adjacent to an end of the beam. In those embodiments, the sensor means preferably includes an accelerometer substantially collocated with said at least one inertial actuator. Preferably also, a second sensor is provided which is spaced apart from said first sensor. The second sensor may be located on an intermediate frame member and provides a signal representative of the beam's gross motion.

In a pivoting robot embodiment, the sensor means includes a rotational sensor, and more preferably, also includes a linear sensor substantially collocated with the inertial actuator. The rotational signal from the rotational sensor is transformed into a signal representative of a gross velocity at a location of the linear sensor. The signal representative of gross velocity is subtracted from a signal derived from said linear sensor to generate a signal representing the beam's vibrational velocity. The work member may be a machine tool adapted to machine a work piece, such as in a gantry robot or horizontal milling machine, a fluid dispenser adapted to apply fluid, such as an adhesive, to a work piece such as in a adhesive dispensing machine, or a manipulator adapted to manipulate a work piece, such as in a robot.

According to the invention, vibration-damped machine may include a plurality of inertial actuators, which may be mounted orthogonal, each having a primary vibration axis for controlling multi-axis vibrations.

According to the invention, the control means further comprises an inertial damping control method which forces the linear-acting inertial actuator to behave as though the linear-acting inertial actuator were a damper attached to ground. Preferably, the control method is a function of a tuning mass and spring stiffness of the at least one inertial actuator.

According to the invention, a method is also provided for damping vibration in a machine having a beam being capable of gross motion in space relative to a stationary frame, means including a motor for causing the gross motion of the beam in at least one direction, the gross motion tending to induce vibration in the beam, and a work member mounted to the beam, the method comprising the steps of: providing at least one signal representative of the beam's induced vibration, mounting at least one linear-acting inertial actuator to the beam, processing the at least one signal and generating at least one output signal, and actively driving the at least one linear-acting inertial actuator responsive to the at least one output signal in the at least one direction at the appropriate phase, frequency and magnitude to damp the beam's induced vibration of the beam. Embodiments of the method are directed towards damping vibrations in gantry robots, fluid dispensing machines, horizontal milling machines and pivoting robots.

Further, and according to the invention, is provided a method for damping vibration in a flexible structure, comprising the steps of: providing a signal representative of induced vibration in said flexible structure, mounting an inertial actuator to the flexible structure at an attachment point, processing the signal representative according to an inertial damping control law to cause the inertial actuator to behave as a damper connected between ground and the attachment point and generating an output signal, and actively vibrating the inertial actuator according to the output signal thereby damping the induced vibration. The method is particularly useful for flexible structures having gross motion in space relative to a stationary frame wherein means for causing the gross motion of the flexible structure in at least one direction induces vibration into the flexible structure.

It is an advantage of the present invention that standard machines can be easily and readily retrofitted to reduce vibration thereof.

It is another advantage of the invention that it provides a simple and cost effective system which improves the machine's operating efficiency by allowing rapid deceleration/acceleration of the machine components.

It is another advantage of the invention that when used for manufacturing or assembly operations, the invention decreases the wait time to allow settling of transient vibration before commencing further operations.

It is another advantage of the invention that when used for manufacturing or assembly operations, that such operations may be sped up.

It is another advantage of the invention that when used for manufacturing or assembly operations, that the quality of such operations may be improved.

It is an advantage of the method that when used for manufacturing or assembly operations, that vibration imparted to the work member is reduced.

It is an advantage of the method that, when used with an inertial actuator, it simulates a damper attached to ground at the inertial actuator's attachment point.

The above-mentioned and further aspects, advantages and characteristics of the present invention will become apparent from the accompanying description of the preferred embodiments and attached drawings.

BRIEF DESCRIPTION OF THE DRAWINGS

The accompanying drawings which form a part of the specification, illustrate several embodiments of the present invention. The drawings and description together, serve to fully explain invention. In the drawings.

DETAILED DESCRIPTION OF THE PREFERRED EMBODIMENT

Figure 1:
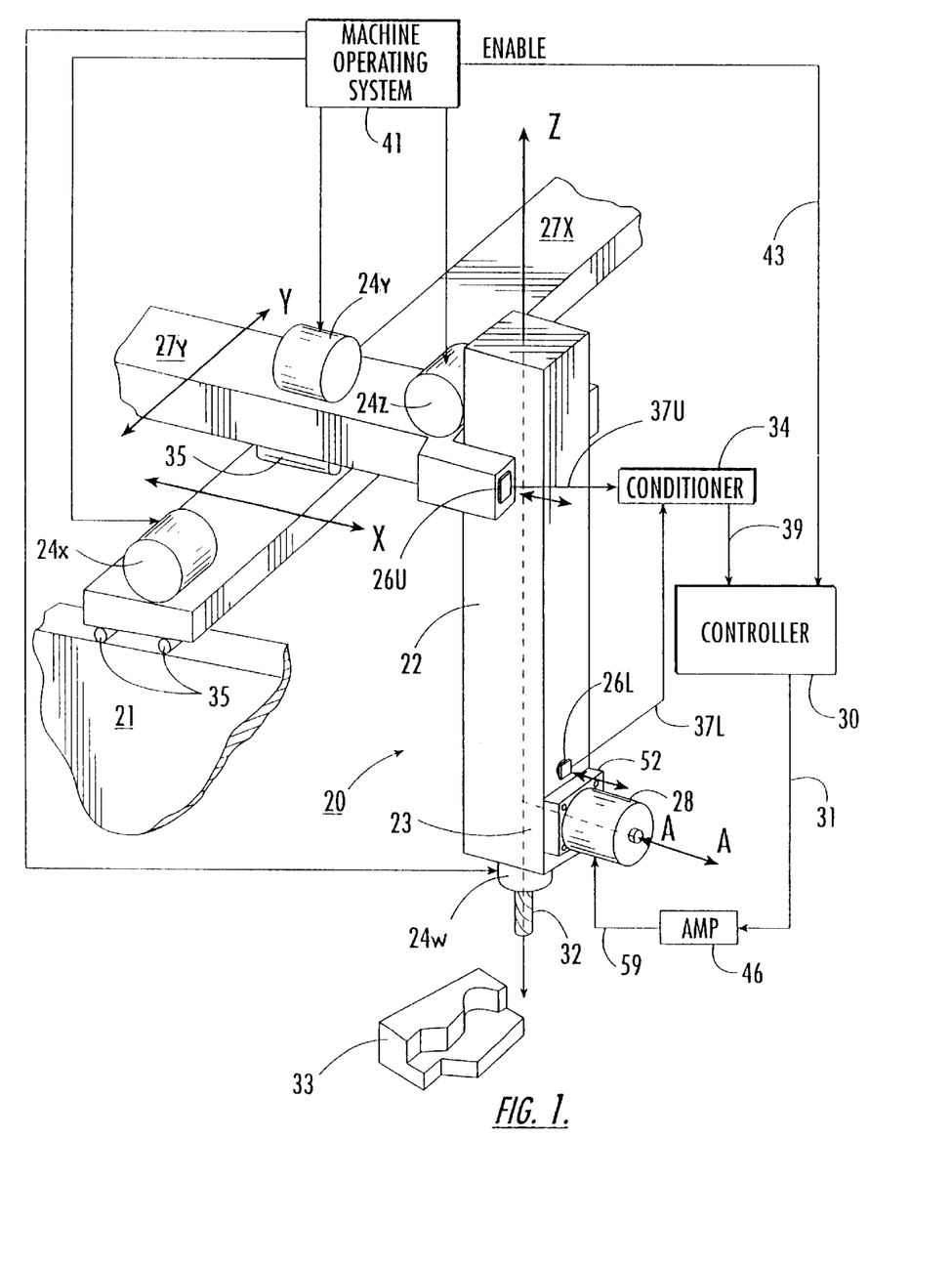
FIG. 1 illustrates a perspective view of a first embodiment of the vibration-damped machine in accordance with the present invention.

Referring now to the drawings where like numerals denote like elements, in FIG. 1, shown generally at 20, is a first embodiment of the present invention vibration-reduced machine. The vibration-reduced machine 20 includes a beam 22, such as a cantilevered beam, being capable of gross movements in space relative to a stationary frame 21, means including a motor, and more preferably a plurality of motors (e.g. 24x, 24y, 24z), for causing gross movements of the beam 22 in at least one direction (x, y, and/or z); the gross movements tending to induce transient vibration within the beam (22) corresponding to the direction of movement. The beam 22 is generally a slender component (having a length longer than a corresponding width dimension) which exhibits inherent flexibility thereby causing it to vibrate when it undergoes gross motion. By the term "gross motion" it is meant that the beam moves on a gross scale, i.e. it translates relative to the stationary frame 21. For example, when the beam 22 is commanded by the machine operating system 41 to undergo gross motion in the x direction, then the beam 22 will flex in bending due to its geometry and inherent flexibility and, resultantly, vibrate along the x direction. Similarly, if the beam 22 is command by the machine operating system 41 to undergo gross motion in the y direction, then the beam 22 will flex in bending and vibrate along the y direction. Multiple modes of vibration may be imparted to the beam 22 and the vibration-reduced machine 20 according to the invention may control any specific mode desired. However, in most cases, the first bending mode will be predominant and be damped. The system 20 in FIG. 1 illustrates a single linear-acting inertial actuator 28 mounted to the beam 22. However, it should be recognized that inertial actuators and sensors may be provided in the y or z directions also to control vibration in those directions, as well. Notably, z axis vibration would generally be induced in the beam 22 by flexing of a beam-like intermediate frame member (e.g. 27y) to which the beam 22 is moveably attached.

Preferably, the machine 20 includes at least one intermediate frame member grossly moveable in space with respect to the stationary frame 21. More preferably, the machine 20 includes a plurality of intermediate frame members 27x, 27y which are moveable with respect to the stationary frame 21 in the respective x and y directions, for example. Preferably, the beam 22 is also moveably mounted (e.g. capable of movement in the z direction) relative to the second intermediate frame member 27y. In this embodiment, a first intermediate frame member 27x is mounted for x direction movement (e.g. capable of x direction movements) relative to the frame 21 and for orthogonal movement relative to a second intermediate frame member 27y which traverses along the y direction. Generally, the beam 22 is also moveable along a third direction (z) which is orthogonal to both the first (x) and second (y) directions.

The rollers 35 shown are representative that the intermediate members 27x, 27y are easily moveable along their respective directions. However, any suitable bearing apparatus or material which allows movement in the desired direction and restrains movement in the undesired directions may be utilized. For example, the first intermediate member 27x requires relative ease of gross movement along the x direction, but should be restrained from gross movement in the y direction relative to the stationary frame 21. Likewise, the second intermediate member 27y requires relative ease of gross movement in the y direction relative to the first intermediate member 27x, but is restrained from gross movement in the x direction relative to the first intermediate member 27x. Similarly, the beam 22 is relatively free to undergo gross movements in the z direction relative to the second intermediate member 27y but is restrained from other gross movements relative thereto.

Gross movement by the members 27x, 27y and beam 22 are accomplished via motors 24x, 24y, 24z, such as stepper or servo motors, which drive gearing systems, pulleys or any other type of mechanical drive (not shown) interconnected to the respective frame 21, member 27x or beam 22. Notably, any suitable drive system may be employed. For example, motor 24x imparts power to the interconnected mechanical drive and powers the first intermediate frame member 27x in either direction along the x axis relative to the stationary frame 21. Likewise, motor 24y powers the second intermediate member 27y along the y axis in both directions relative to the first intermediate frame 27x. Lastly, motor 24z powers the beam along the z axis in both directions relative to the second intermediate member 27y.

The machine 20 also includes a work member 32 mounted to the beam 22. The work member 32 may be a router bit, a machine tool, a fluid dispenser, a probe, a manipulator, or any other moving member suitable for producing useful work such as, for example, machining or cutting an object, moving an object or dispensing a medium. In this embodiment, the work member 32 includes a machine tool, such as the router bit shown mounted to a router motor 24w. The router motor 24w mounts the work member 32 to the beam and rotates the work member 32 according to control signals from the operational system 41 to machine, cut or otherwise remove material from a work piece 33. Gross movements of the beam 22 in the x, y and z directions are controlled by a machine operating system 41 via control signals 41x, 41y, 41z and 41w to power respective motors 24x, 24y, 24z, 24w. Moreover, the router 24w may be moveably mounted relative to the end 23 of the beam 22 to provide a $4^{th}$ or even a $5^{th}$ axis for machining.

Figure 7:
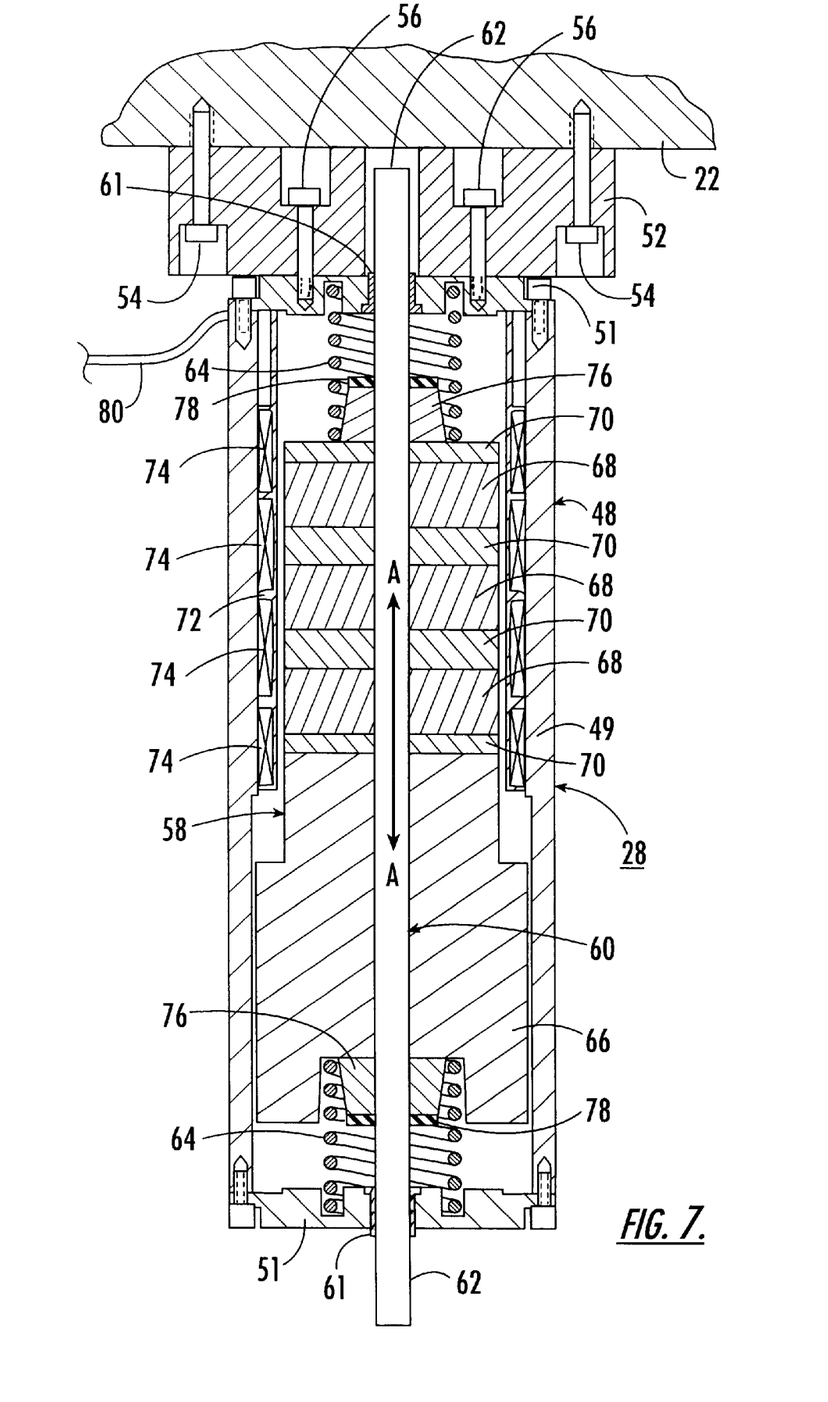
FIG 7 illustrates a cross-sectioned side view of the preferred linear-acting inertial actuator configuration.

At least one linear-acting inertial actuator 28 is also mounted to the beam 22 and vibrates along its primary vibration axis. Most preferably, both the work member 32 and the at least one linear-acting inertial actuator 28 are positioned adjacent to the cantilever beam's end portion 23. The actuator 28 is mounted normal to the beam 22 and produces inertial forces which act generally perpendicular to, yet through, the beams neutral axis. A preferred linear-acting inertial actuator 28 is described with reference to FIG. 7. It should be recognized that inertial actuators are otherwise referred to as mass,actuators, proof mass actuators or active tuned vibration absorbers, however, any suitable inertial device may be employed with the present invention. A linear-acting inertial actuator attaches at one point only on the structure (e.g. the beam) and is vibrated utilizing its inertia to bring about a vibrational change in the structure it is attached to. As shown in FIG. 7, the linear-acting inertial actuator 28 referred to herein includes a tuning mass 58 flexibly suspended by one or more springs 64 and preferably attaches to the beam 22 at a point where vibration is predominant. The mass 58 and springs 64 are selected (tuned) such that the inertial actuator's natural frequency fn is somewhat below the disturbance frequency fd. The actuator 28 is then vibrated according an inertial damping control method described later herein such that sufficient force is generated to provide an acceptable level of damping of the beam 22.

The preferred linear-acting inertial actuator 28 is a model AFX-470 available from Motran Industries, Inc. of Valencia, Calif. and includes a mass of about 11.5 Kg, a spring stiffness of about 8789 N/m, and a natural frequency of about fn=4.4 Hz. For stability of the inertial damping control method described later herein, it is desirable to keep the ratio of fn/fd equal to about 0.76 or less. The actuator 28 preferably produces about 300N force at about 5.75 Hz. Of course, the amount of force required and tuning is dependent on the mass, stiffness and damping inherent in the beam and, therefore, would be selected based upon these design considerations for each application in order to achieve sufficient damping, say, for example, at least about 5% of critical, and more preferably greater than about 15%.

Again referring to FIG. 7, the linear-acting inertial actuator 28 is mounted to the beam 22 by way of a rigid mounting adapter 52. Bolts 54 secure the adapter 52 to the beam 22 and bolts 56 secure the housing 48 to the adapter 52. The housing 48 includes a highly magnetically permeable steel cylindrical body 49 and end caps 51. Low friction Delrin® bushings 61 received in caps 51 radially support the shaft 60 at its ends 62, but also allow the shaft 60 to slide along the actuator's line of action A—A. The tuning mass 58 is comprised of the mass of the shaft 60, the mass of the stacked magnets 68 and pole pieces 70, the mass of the brass supplemental mass 66, the mass of retainers 76 and bumpers 78, and part of the mass of the springs 64. The mass and stiffness are tuned, via adjusting the mass of supplemental mass 66 and stiffness of springs 64, to tune the natural frequency fn of the actuator 28. The magnets 68 are permanent magnet discs and produce a standing magnetic flux which is carried in disc-shaped highly magnetically permeable steel pole pieces 70 and cylindrical body 49. A plurality of alternately wound hoop-wound electrical coils 74 of coated copper motor wire are wound onto the plastic or aluminum bobbin 72. Energizing the coils 74 by providing current representative of the amplified output signal 59 through electrical lead 80 produces a alternating magnetic field which interacts with the standing magnetic field produced by the magnets 68 thereby causing the tuning mass 58 to oscillate along the line of action A—A. The pole pieces 70, magnets 68, and supplemental mass 66 are secured in place by steel retainers 76 press fit on steel shaft 60. The bumpers 78 are elastomer and prevent metal-to-metal contact between the pole piece 70 and cap 51 on one end and between the supplemental mass 66 and cap 51 on the other. Notably, the design of the actuator described herein is exemplary and any suitable linear-acting inertial actuator may be utilized.

Sensor means are included in the machine 20 for providing at least one signal representative of the vibration (example bending vibration) induced in the beam 22. Preferably, the sensor means comprises a first lower sensor 26L substantially collocated with at least one linear-acting inertial actuator 28 near the first end 23 and a second sensor 26U spaced apart from the first sensor 26L. The term "collocated" used herein means that the sensor may be located within ¼ wavelength of the highest frequency to be controlled from the inertial actuator. Preferably, the second upper sensor 26U is located on an intermediate frame member 27y near the attachment point of the beam 22 thereto. Generally, the second sensor 26U provides an input signal representative of the gross motion of the beam 22 in the direction of interest. For example, as shown, the sensor 26U provides an input signal 37U indicative of the beam's gross motion (that commanded by the machine operating system 41) in the x direction. The first sensor 26L provides an input signal representative of the gross motion plus any superimposed induced beam vibration. For example, the sensor 26L shown provides an input signal 37L representative of gross motion plus any superimposed induced bending vibration in the x direction. These input signals 37U, 37L are then conditioned and subtracted by means of a conditioner 34 to provide a differential motion (vibration) signal, as will be described in more detail later herein. The conditioner 34 produces a conditioned signal 39 which is then provided to the controller 30. Most preferably, the sensor means comprises spaced apart first and second sensors 26L, 26U which are accelerometers. By way of example, and not to be considered limiting, model 812A5M1 accelerometers manufactured by Kistler of Buffalo, N.Y. were found by the inventors to work acceptably.

Control means, such as the controller 30 shown, are provided for processing the at least one signal and generating at least one oscillatory output signal 31. The output signal 31 is amplified via amplifier 46 to produce an amplified output signal 59 and actively drive the at least one linear-acting inertial actuator 28 at the appropriate phase, frequency and magnitude to minimize the beam's induced vibration. The frequency is coincident with the frequency of induced vibration. The phase is set by the control method and the magnitude is based upon the output signal and the physical capabilities of the actuator 28. The controller 30 may be enabled/disabled via a switch 53 which is activated by a remote enable signal 43 coming from the machine operating system 41. For clarity, the power supply required to power the various components is not shown in all embodiments herein.

Figure 2:
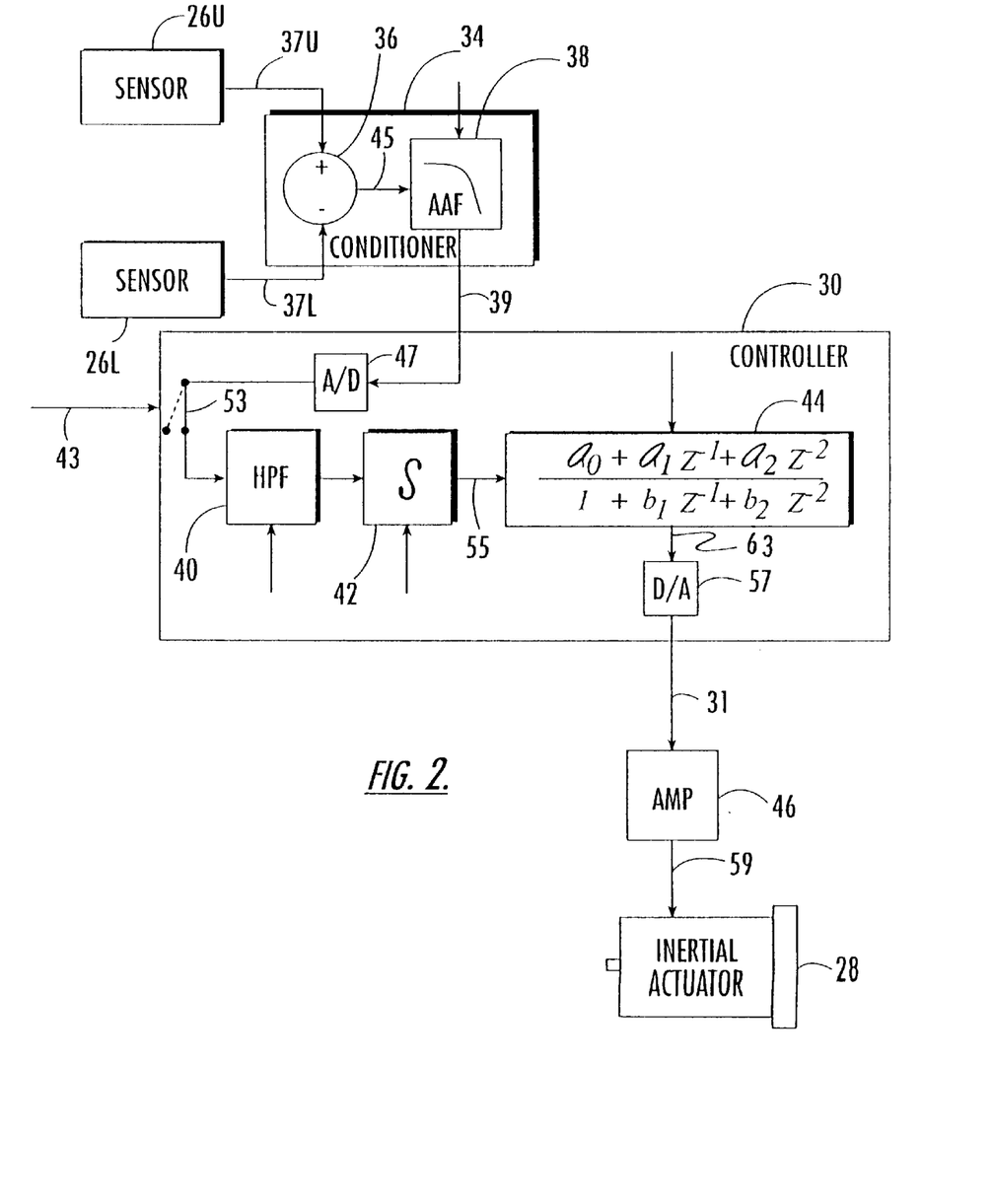
FIG. 2 illustrates a block diagram of the control method for the embodiment of FIG. 1.

As best shown in FIG. 2, the input signals produced by sensors 26U, 26L are subtracted at junction 36 within conditioner 34. The signal in line 45 is a signal that represents the induced vibration in the beam 22, i.e., the gross motion has been removed via the subtraction process. This signal in line 45 is then filtered by an Anti-Aliasing Filter (AAF) 38. The AAF 38 is preferably set to attenuate the input signal by about 30 dB at the Nyquist frequency of 500 Hz and it appropriately conditions the signal for use. The AAF 38 within the conditioner 34 is preferably a model 5126A1 conditioner manufactured by Kistler of Buffalo, N.Y. The arrow into the AAF 38 indicates that the knee of the filter may be set as needed. The conditioned induced vibration signal 39 is then provided to the controller 30.

The controller 30 preferably comprises a Model 31 High Board digital signal processor manufactured by DSP Tools of Potomac, Md. The controller 30 converts the incoming signal 39 into digital form via the A/D converter 47. The afore-mentioned switch 53 in software is operatively switched from "off" to "on" based upon the enable/disable signal 43 received from the machine operating system 41 (FIG. 1). The switch 53 allows the control process to commence deriving an output signal 31 only at times when enabled (set to "on") by the operating system 41.

Within the controller 30, the cutoff frequency of a digital High Pass Filter (HPF) 40 is set at about 0.25 Hz to eliminate any DC bias in the incoming signal. A digital integrator 42, which is preferably an averaging integrator, includes a time constant which is set to about ⅓ sec. This integrator 42 integrates the incoming conditioned induced differential vibration signal, which is preferably a signal representing acceleration motion, and provides at its output 55 a signal representative of the vibrational velocity signal of the beam 22 at a location of the first sensor 26L. The arrows into HPF 40 and integrator 42 indicate that the cutoff frequency and time constant parameters mentioned may be set and/or reset in software.

The signal representing velocity motion in line 55 is then provided to the control method 44. The transfer function preferably takes the form shown in FIG. 2. This control method (herein referred to as the inertial damping control method) forces the linear-acting inertial actuator 28 to behave as though it were a damper connected to ground thereby damping any sensed induced beam vibration.

The inertial damping control method is developed as follows. First, equation (1) representative of the motion of the actuator 28 is derived:

$$m_a \ddot{x}_a = k_a(x_s - x_a) + b_a(\dot{x}_s - \dot{x}_a) + F_a \quad (1)$$

where $m_a$ is the mass of the tuning mass 58 of the linear-acting inertial actuator 28, $k_a$ is the combined stiffness of the springs 64 supporting the tuning mass 58, $x_s$ is the vibrational displacement of the beam 22 at the location of actuator 28, $x_a$ is the vibrational displacement of the tuning mass 58, $b_a$ is the damping coefficient of the tuning mass 58, and $F_a$ is the force acting on the tuning mass 58 produced by energizing the coils.

The force transmitted to the beam 22 from the actuator 28 then becomes:

$$F_s = -m_a \ddot{x}_a = -m_a \dot{v}_a \quad (2)$$

where $F_s$ is the force on the beam 22 from the linear-acting inertial actuator 28, and $V_a$ is the velocity of the tuning mass 58. To achieve increased damping in the beam 22 it is desired that the force transmitted to the beam 22 be of the following form:

$$F_s = -b_d \dot{x}_s = -b_d v_s \quad (3)$$

where $b_d$ is the desired damping coefficient of the beam 22.

Therefore, the desired form of the inertial damping control transfer function is:

$$\frac{F_a}{\dot{x}_s} \Rightarrow \frac{F_a}{v_s} \Rightarrow \frac{F_a(s)}{V_s(s)} \quad (4)$$

Taking the Laplace transform of the equation of motion provides:

$$m_a s^2 X_a(s) = k_a X_s(s) - k_a X_a(s) + b_a s X_s(s) - b_a s X_a(s) + F_a(s) \quad (5)$$

where
s is the Laplace frequency domain variable.
It is desired that the equation be expressed in terms of readily obtained velocities, therefore:

$$V_a(s) = s X_a(s) \quad (6)$$

$$V_s(s) = s X_s(s) \quad (7)$$

where
$V_a$, $V_s$ are the velocities of the tuning mass 58 and beam 22, respectively.

Substituting equations 6 and 7 into 5 and multiplying by s gives:

$$m_a s^2 V_a(s) = k_a V_s(s) - k_a V_a(s) + b_a s V_s(s) - b_a s V_a(s) + s F_a(s) \quad (8)$$

Combining equations 2 and 3 gives:

$$V_a(s) = \frac{b_d}{m_a s} V_s(s) \quad (9)$$

Substituting this into equation 8, multiplying by s and solving for the desired transfer function shown in equation 4, the novel inertial damping control method takes the form:

$$\frac{F_a(s)}{V_s(s)} = \frac{(b_d - b_a)s^2 + \left(\frac{b_a b_d}{m_a} - k_a\right)s + \left(\frac{k_a b_d}{m_a}\right)}{s^2} \quad (10)$$

The application of this inertial damping feedback control method of equation 10 to the linear-acting inertial actuator 28 will cause the beam 22 to behave as though a damper is attached between ground and the attachment point of the linear-acting inertial actuator 28. Taking a bilinear transformation of equation 10 will produce the discrete-time transfer function shown in FIG. 2 as is known to those of ordinary skill in the art. The values of constants $a_0$, $a_1$, $a_2$, $b_1$, $b_2$ are derived from the transformation. The velocity signal in line 55 is operated upon by the inertial damping feedback control method transfer function in block 44 and produces a digital output signal 63.

This output 63 is sent to the D/A converter 57 at about 1000 Hz, thus producing at its output an analog output signal 31. The output signal 31 from the controller 30 is then amplified by amplifier 46 to produce an amplified output signal 59. Preferably, the amplifier 46 is a model 16A20ACT amplifier manufactured by Advanced Motion Controls of Camarillo, Calif. The amplified output signal 59 drives the linear-acting inertial actuator 28 thereby damping the beam's induced vibration. Accordingly, the linear-acting inertial actuator 28 is controlled responsive to feedback from a signal representative of a vibrational velocity differential between a first and a second input signals 37L, 37U, i.e., a signal such as in line 55 representative of the vibrational velocity of the beam 22 at a location of the first sensor 26L.

For example, in the case of a gantry robot system shown in FIG. 1, it was found that the beam's resonant frequency, and thus the frequency of induced vibration in the beam 22, was about fd=5.75 Hz. Proper selection and actuation of the linear-acting inertial actuator 28 according to the inertial damping feedback control method illustrated above produces a viscous damping factor of about 15% which is sufficient to damp induced vibrations in the beam 22. The damping factor represents a percentage of the critical damping factor. Thus, 15% or greater is generally enough system damping to sufficiently damp transient induced vibrations in the beam 22 within about ½ sec. By way of example, an undamped structure may exhibit about 1%–2% damping factor due to internal damping and vibrations may ring out for eight seconds or more before being sufficiently damped out. Therefore, it should be understood that the vibration-damped machine in accordance with the invention exhibits dramatically reduced settling times.

Figure 3:
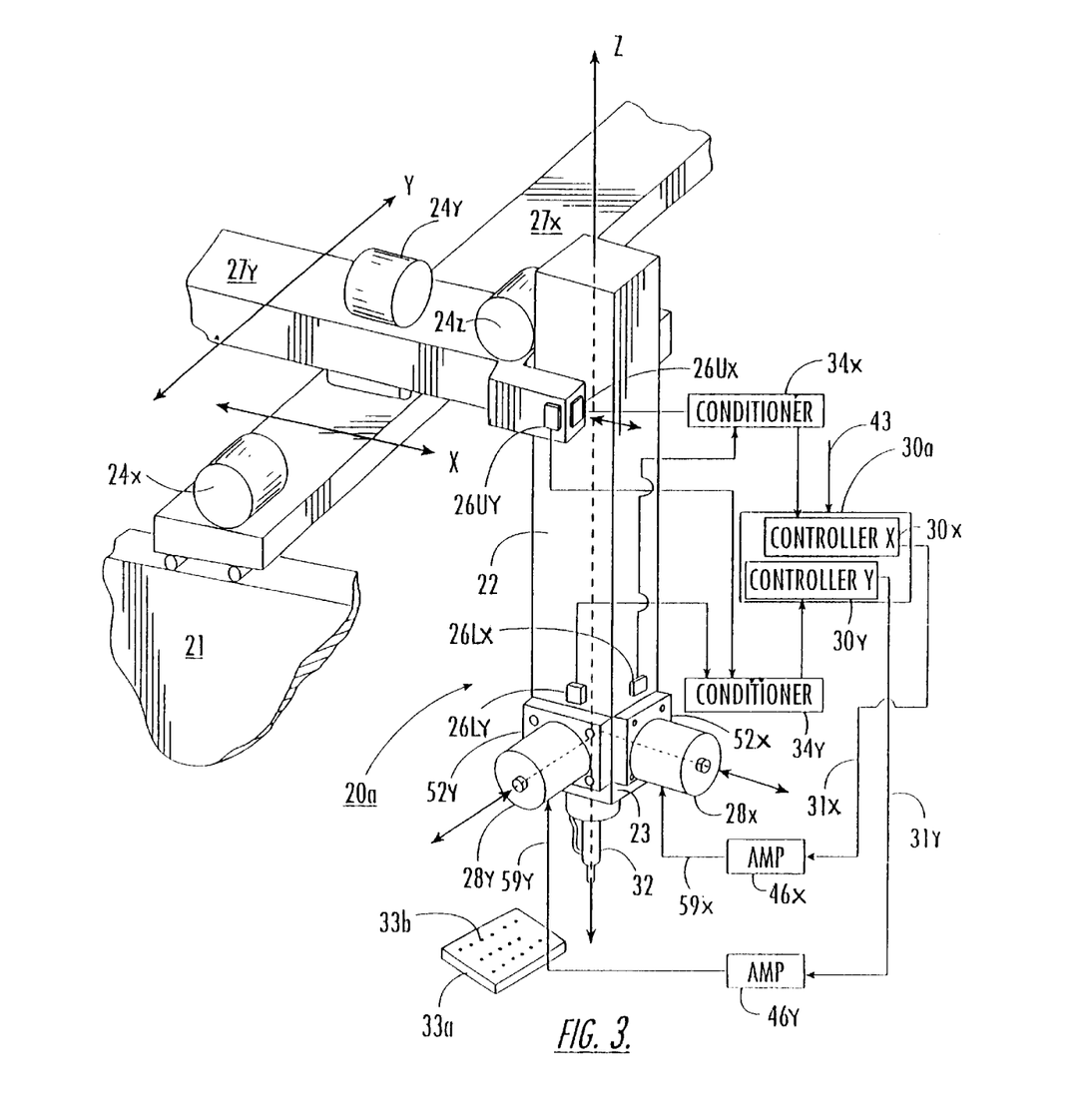
FIG. 3 illustrates a second embodiment of the vibration-damped machine in accordance with the present invention including multi-direction actuation.

FIG. 3 illustrates an alternative embodiment of vibration-damped machine 20a. In this embodiment, a plurality of inertial actuators 28x, 28y are mounted to the end 23 the beam 22 by adapters 52x, 52y. The primary vibration axis, i.e., the line of action of each of the actuators 28x, 28y (as indicated by arrows labeled A—A), are preferably oriented substantially orthogonal to each other. Accordingly, the actuator 28x damps induced beam vibration along the x direction and actuator 28y damps induced beam vibration in the y direction. Signals from sensors 26Ux, 26Lx and 26Uy, 26Ly collocated with the actuators 28x, 28y are processed by the respective conditioner 34x, 3⁴y to produce conditioned outputs 39x, 39y. The controller 30a then processes the conditioned inputs 39x, 39y and produces output signals 31x, 31y. Amplifiers 46x, 46y amplify the output signals 31x, 31y to provide amplified signals 59x, 59y. The inertial actuators 28x, 28y are then driven responsive to the amplified signals 59x, 59y.

Each actuator 28x, 28y is controlled independently of the other according to the control architecture of controller 30 described with reference to FIG. 2 and preferably according to the inertial damping control method before described herein. Therefore, it should be understood that two controllers 30x, 30y identical to that shown in FIG. 2 are included in the controller 30a; one controller 30x for controlling x induced beam vibrations and another controller 30y for controlling the damping of the beam's y vibrations. The conditioners 34x, 34y and amplifiers 46x, 46y are exactly the same as the conditioner 34 and amplifier 46 of FIG. 2. A remote enable signal 43 may be provided from the machines operating system (not shown) for starting and stopping the vibration damping at appropriate times. Preferably, the work member 32 is mounted to the beam 22 at its end 23 and comprises a fluid dispenser adapted to apply a fluid, such as an adhesive, to a work piece 32, such as an electronic circuit board. In particular, the fluid dispenser may apply precisely metered and located amounts of a fluid 33b, such dots of adhesive to the work piece 33a. The vibration-reduced machine 20a according to the invention increases quality and/or throughput of the fluid application process. The carriage assembly comprising intermediate members 27x, 27y is the same as before described. Likewise, the motors 24x, 24y, 24z function to move the intermediate members 27x, 27y and the beam 22 in the respective x, y and z directions relative to the stationary frame 21 as outlined above.

Figure 4:
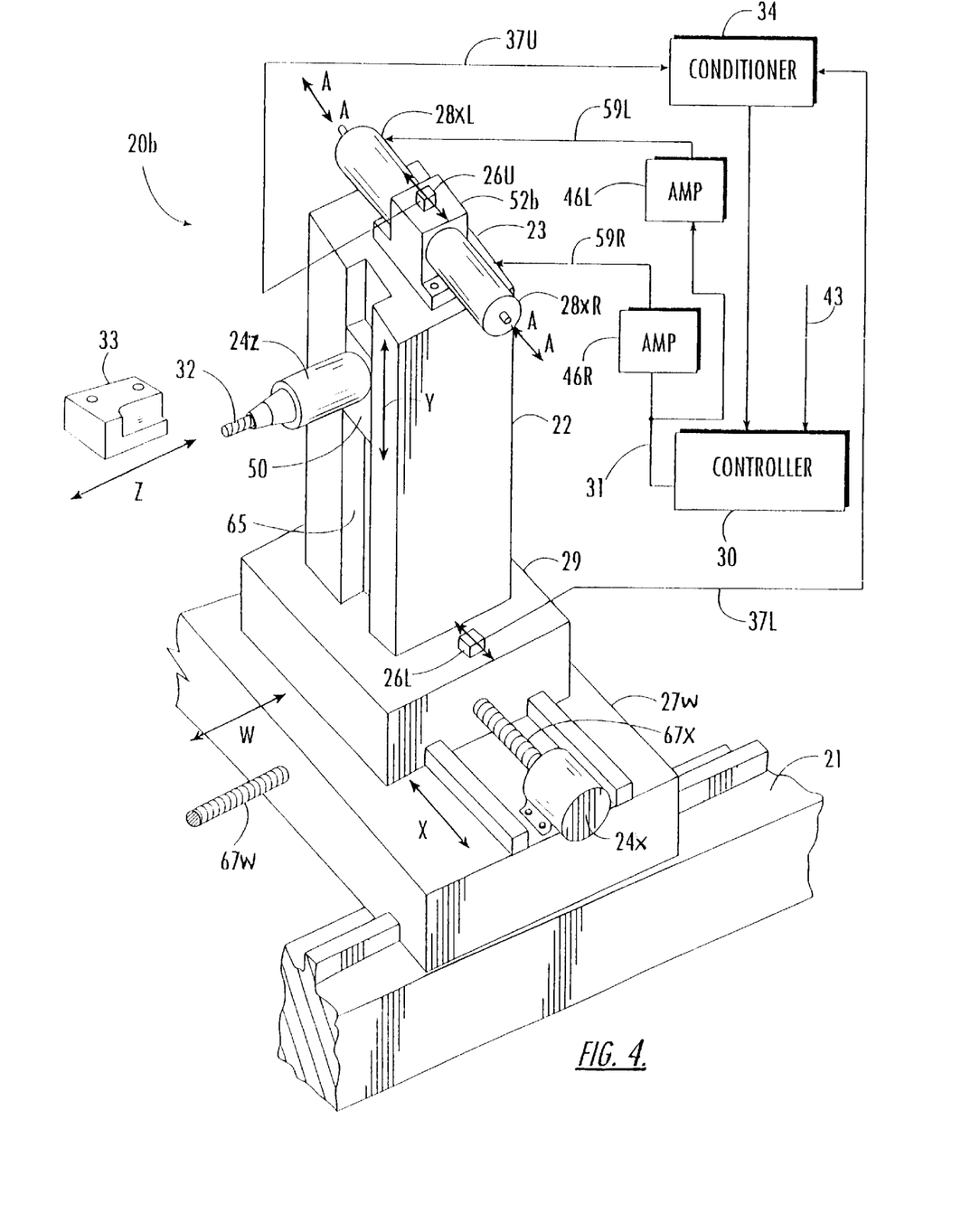
FIG. 4 illustrates a third embodiment of the vibration-damped in accordance with the present invention.

FIG. 4 illustrates yet another embodiment of vibration-reduced machine 20b wherein the beam 22 is vertically mounted to a base 29 which is moveable along the x direction relative to an intermediate frame member 27w. The intermediate frame member 27w moves along the w axis relative to a stationary frame 21. The work member 32, in this embodiment a milling tool, is moveably mounted relative to the beam 22. In the illustrated embodiment, the work member 32 is mounted to the beam by a motor 24z and a slider block 50. The motor 24z rotates the work member 32, but also moves the work member 32 along the z axis relative to the beam 22. The slider member 50 slides vertically only along the y axis within a recess 65 formed in the beam 22.

A motor (not shown) mounted to stationary frame 21 rotates power screw 67w to provide gross movements to the intermediate frame member 27w along the w axis. Likewise, motor 24x mounted to intermediate frame member 27w rotates power screw 67x to move base 29 and beam 22 in the x direction. Rapid gross movements of the beam 22 in space along the x direction relative to the stationary frame 21 cause transient bending vibrations to be induced in the beam 22.

Sensor means, such as an upper accelerometer sensor 26U mounted atop the adapter 52b and a lower sensor 26L mounted to the base 29, provide at least one signal representative of the induced bending vibration in the beam 22. The lower sensor 26L provides signal representative of the beam's gross motion along the x direction. The second sensor 26U provides a signal representative of the gross x motion plus any superimposed, induced transient x vibration. Both input signals 37U, 37L are provided to the conditioner 34 which subtracts and filters them as described in FIG. 2.

At least one inertial actuator, and more preferably a plurality of inertial actuators 28xL, 28xR, are mounted to the beam at an end 23 thereof by adapter 52b and are vibrated at the appropriate frequency, phase and amplitude to damp any such induced vibrations. This reduces the settling time before commencing the next machining operation, reduces overshoot, and may improve quality as well. The primary vibration axis A—A of each of the plurality of inertial actuators 28xL, 28xR are substantially parallel and act through the center of the beam 22 such that any rotation is minimized.

The conditioned signal 39 is then provided to the controller 30 which is identical to that described in FIG. 2. The controller 30 processes the conditioned signal 39 preferably according to the inertial damping control method outlined above and generates an output signal 31 which, upon being amplified by amplifiers 46L, 46R, produce amplified output signals 59L, 59R to actively drive the inertial actuators 28XL, 28XR at the appropriate phase, frequency and magnitude to minimize the induced vibration of the beam 22. A remote enable signal 43 may be provided from the machines operating system (not shown) for starting and stopping the vibration damping at appropriate times.

Figure 5:
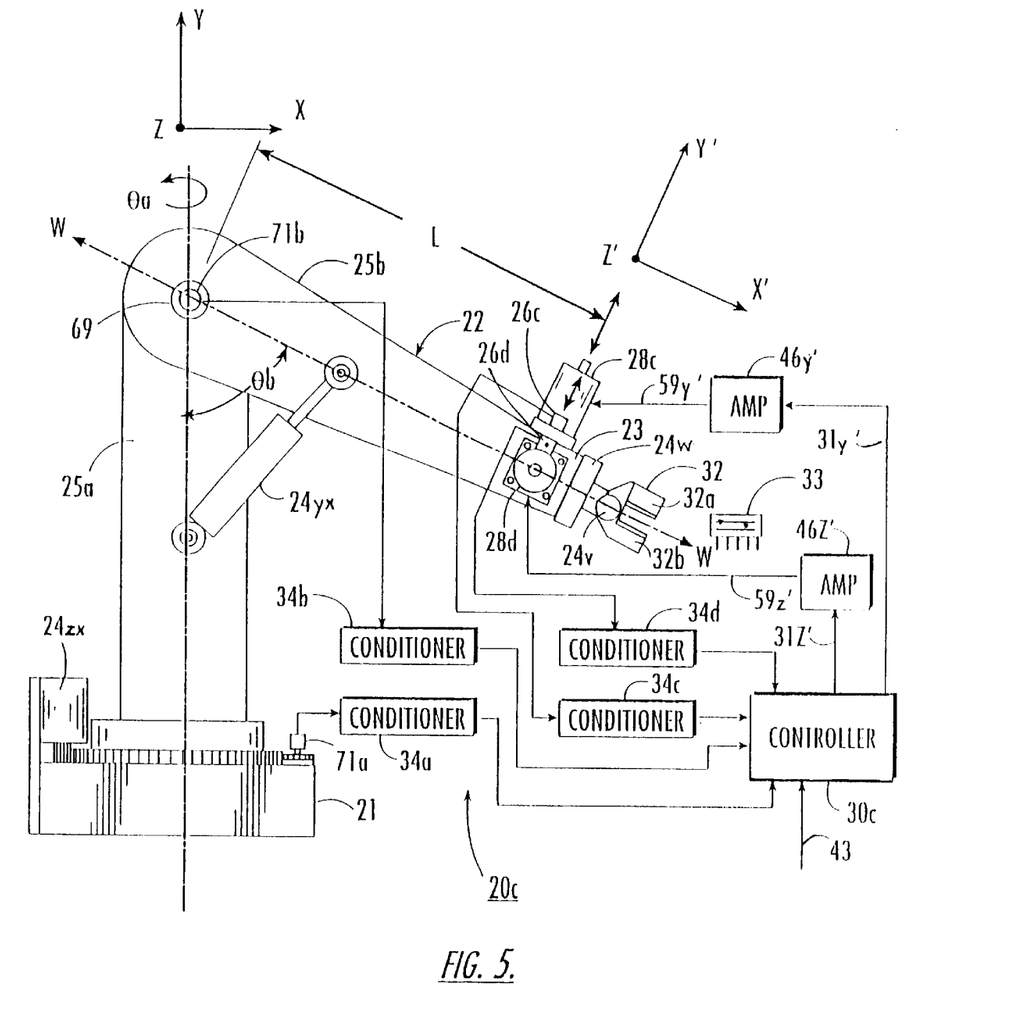
FIG. 5 illustrates a fourth embodiment of the vibration-damped machine in accordance with the present invention.

FIG. 5 illustrates another embodiment of vibration-damped machine 20c which comprises a beam 22 including a first arm 25a and a second arm 25b. The second arm 25b is pivotally mounted by a pivot 69 to the first arm 25a and includes an end portion 23 spaced from the pivot 69. The beam 22 is capable of gross movements in space relative to a stationary frame (21). Means including at least one motor, and more preferably a plurality of motors 24zx, 24yx, cause the gross movements of the beam 22 in at least one direction. By operation of motors 24zx and 24yx, movements in the X, Y, or Z direction may be accomplished. As herein before described, rapid gross movements generated by the motors 24zx and 24yx tend to induce vibration within the beam 22 and its respective arms 25a, 25b.

A work member 32 is mounted to the beam 22 at its end 23. Preferably, the work member 32 comprises a manipulator (otherwise referred to as end effector) adapted to grasp and manipulate a work piece 33, such as the computer chip shown and facilitates assembly thereof into a circuit board (not shown). However, any other work member 32 may be used, such as a welding apparatus, glue applicator, cutting tool, or the like. This manipulator maybe mounted to beam 22 by a rotational motor 24w for producing rotation of the work piece 33 about the w-w axis. The manipulator may also include a motor 24v for optional rotation about the Z' axis. Preferably, the manipulator includes a first portion 32a which is moveable relative to a second portion 32b to allow gripping of the work piece 33.

Sensor means are included for providing at least one signal representative of an induced vibration in the beam 22. In this embodiment, the sensor means comprises at least one linear motion sensor and at least one rotation sensor. More preferably a plurality of linear motion sensors 26c, 26d are provided which measure gross plus superimposed vibration motions along the Y' axis and Z' axis, respectively. Preferably, the linear motion sensors 26c, 26d are accelerometers and are collocated with the inertial actuators 28c, 28d and measure acceleration along the respective Y' and Z' axes. A plurality of rotation sensors 71a, 71b measure the respective rotations of arms 25a, 25b.

In this embodiment, the rotational signal from the rotational sensor is transformed, as explained below, into a signal representative of a gross motion at a location of the linear sensors. The signal representative of the gross motion is then subtracted from a signal derived from the linear sensor to derive a signal representative of the induced vibration in the beam 22 as will be explained in more detail later herein.

At least one inertial actuator, and more preferably a plurality of actuators 28c, 28d, are mounted on the beam 22, and more preferably mounted to the second arm 25b adjacent to the end 23 thereof. The actuators 28c, 28d are of the same design as described in FIG. 7 and are preferably orthogonal mounted relative to each other such that they damp vibrations of the beam 22 in both the Y' and Z' directions. Control means are provided for processing the at least one signal and generating at least one output signal, and more preferably a plurality of output signals 59y', 59z' to actively drive the at least one inertial actuator, and more preferably the multiple actuators 28c, 28d, at the appropriate phase, frequency and magnitude to minimize the induced vibration of the beam 22.

Figure 6:
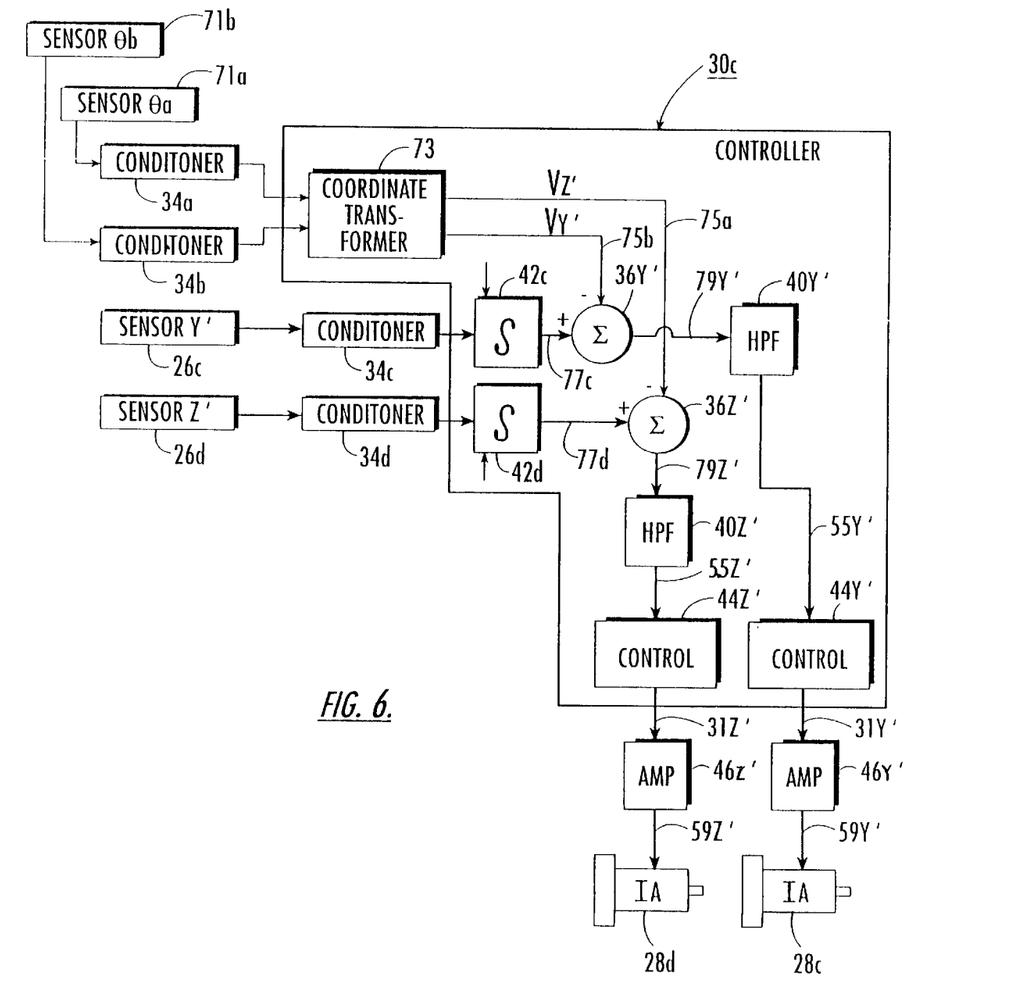
FIG. 6 illustrates a block diagram of the control method for the embodiment of FIG. 5.

The control is described in more detail with reference to FIGS. 6 and 7 wherein rotation sensors 71a, 71b provide signals representative of the rotational displacement $\theta_a$ of the first arm 25a relative to the stationary frame about the Y axis and rotational displacement $\theta_b$ of the second arm 25b about the Z axis pivot 69, respectively. These rotational displacement signals are provided to conditioners 34a, 34b which appropriately filter the signals. The conditioned input signals are then provided to the controller 30c where they are transformed by a coordinate transformer 73 into linear motions in the X', Y', Z' reference frame at the position of the sensors 26c, 26d which are substantially collocated with the inertial actuators 28c, 28d at a distance L from the pivot 69. The transformation equations which transform the rotational displacements into linear motions in the transformed coordinate system are derived as follows: First, the positions in the X, Y, and Z coordinate system are defined as:

$$X = L \cos\theta_b \cos\theta_a \tag{11}$$

$$Y = L \cos\theta_b \sin\theta_a \tag{12}$$

$$Z = L \sin\theta_b \tag{13}$$

Where

L is the radius from the pivot to the sensors 26c, 26d,

$\theta_a$ is the rotation of arm 25a about the Y axis, and $\theta_b$ is the rotation of arm 25b about the Z axis.

Next the coordinate transform is completed providing:

$$\dot{Z}'=\dot{X} \sin \theta_b + \dot{Z} \cos \theta_b \qquad (14)$$

$$\dot{Y}'=\dot{X} \sin \theta_a \cos \theta_b + \dot{Y} \cos \theta_a \dot{Z} \sin \theta_a \sin \theta_b \qquad (15)$$

and $$\dot{X}=-L\theta_b \sin \dot{\theta}_b \cos \theta_a - L\dot{\theta}_a \sin \theta_a \cos \theta_b \qquad (16)$$

$$\dot{Y}=-L\theta_b \sin \theta_b \sin \theta_a + L\dot{\theta}_a \cos \theta_a \cos \theta_b \qquad (17)$$

$$\dot{Z}=L \dot{\theta}_b \cos \theta_b \qquad (18)$$

Substituting equations 16, 17 and 18 into equations 14 and 15 provides equations 19 and 20 below representing the transformed gross motions Vz', Vy' in lines 75a, 75b at the locations of sensors 26c, 26d, respectively.

$$Vz'=L \dot{\theta}_a \sin \theta_a \sin \theta_b \cos \theta_b + L \dot{\theta}_b [\cos^2 \theta_b + \sin^2 \theta_b \cos \theta_a] \qquad (19)$$

$$Vy'=L \dot{\theta}_a \cos \theta_b [\cos^2 \theta_a - \sin^2 \theta_a \cos \theta_b] + L \dot{\theta}_b \sin \theta_a \sin \theta_b [\cos \theta_b \sin \theta_b - \cos \theta_a - \cos \theta_b] \qquad (20)$$

These values Vz', Vy' in lines 75a, 75b are readily calculated from the sensor values $\theta_a$ and $\theta_b$ and $\dot{\theta}_a$ and $\dot{\theta}_b$ and represent the gross velocity motion at the location of sensors 26c, 26d. The signals $\theta_a$ and $\theta_b$ may be processed in transformer 73 to derive velocity. Optionally, the velocity may be provided by one or more additional sensors. Moreover, the robot operating system (not shown) may provide the displacement and/or velocity signals to the controller 30. Further, a remote enable signal 43 from the robot operating system (not shown) may be provided to disable the control when not required. The acceleration signals from sensors 26c, 26d are conditioned in conditioners 34c, 34d and provided to integrators 42c, 42d which integrate them to produce velocity signals at 77c, 77d. These velocity signals at 77c, 77d are representative of the gross velocity motions in the beam 22 plus any superimposed transient velocity motions (vibrations) of the beam 22.

At junctions 36Y', 36Z' the respective velocity values are subtracted to produce vibrational velocity signals 79Y', 79Z' representative of the induced velocity vibrations in the beam 22 at the position of sensors 26c, 26d. High pass filters 40Y', 40Z' filter the signals to remove any DC bias. The filtered signals are then provided to the inertial damping control method which operates on the signals 55Y', 55Z' to produce an output signals 31Y', 31Z'. These output signals 31Y', 31Z' are amplified to produce amplified output signals 59Y', 59Z' which drive the Inertial Actuators (IA's) 28c, 28d to damp induced vibrations in the beam 22 and arms 25a, 25b due to rapid gross motions commanded by the machine operating system (not shown). As should be apparent, the inertial actuators may be mounted to either arm 25a, 25b to control induced vibration thereof. A simple version may include a single inertial actuator, such as actuator 28c located at the end 23 of the second arm 25b. Other types of damping control may be substituted for that described for all embodiments herein.

Figure 8:
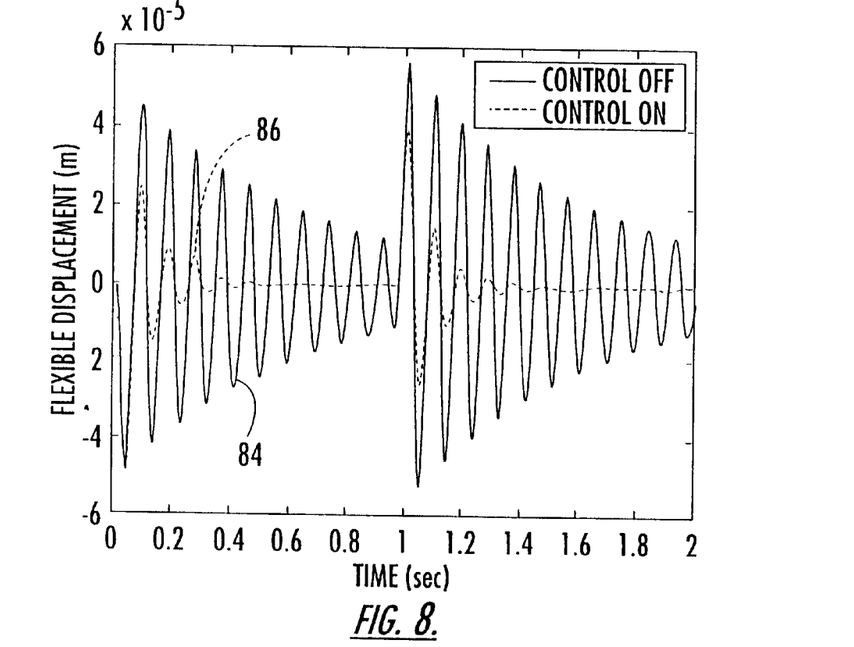
FIGS. 8 and 9 illustrate representative performance plots of the vibration-damped machine.
Figure 9:
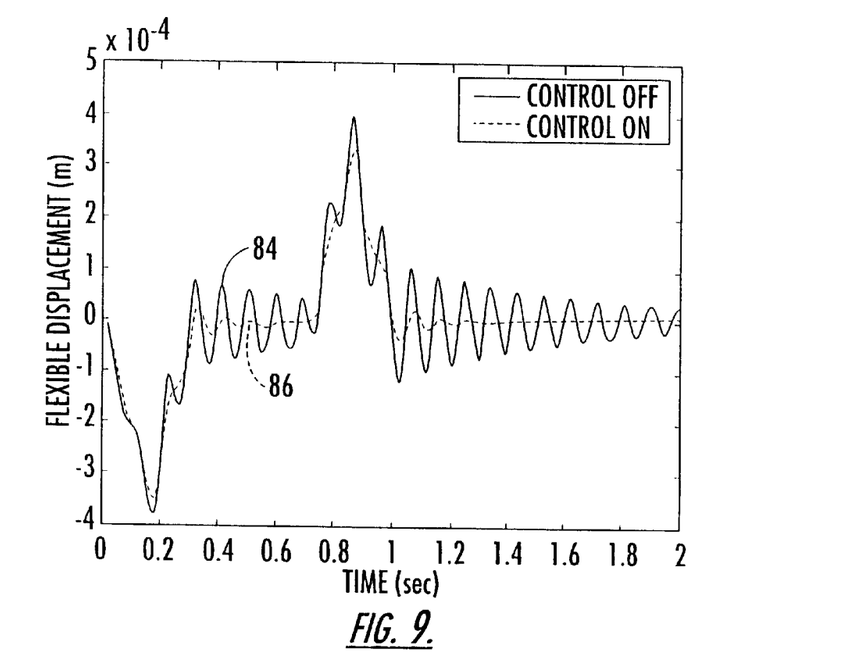

FIGS. 8 and 9 illustrate representative performance curves of the vibration-damped machine 20. FIG. 8 illustrates a simulated response of the vibration-damped machine to a pseudo-impulsive maneuver, such as an abrupt start or stop. As shown, the vibration of the uncontrolled machine as depicted by solid line 84 exhibits a ring out for a substantial period of time. Contrarily, when the vibration-damped machine 20 in accordance with the present invention is operative, and the inertial damping control method described herein is utilized, the vibration is damped very quickly as is depicted by dotted line 86. Typical maneuvers are shown in FIG. 9 wherein each time the beam is commanded to move, a transient vibration is induced. Applying the control method and vibration-damped machine described herein illustrates the dramatic improvement in settling time achieved when comparing the uncontrolled system of line 84 against the controlled system of 86.

In summary, it should be apparent from the foregoing that the present invention comprises a novel vibration-reduced machine and method therefor. The vibration-damped machine comprises a beam being capable of gross movements in space relative to a stationary frame, means for causing the beam's gross movements; the gross movements tending to induce vibration into the beam, sensor means for providing a signal representative of the induced beam vibration, a linear-acting inertial actuator mounted to the beam, and control means for receiving the signal and generating an output signal to actively drive the linear-acting inertial actuator at the appropriate phase, frequency and magnitude to damp induced beam vibrations.

The present invention is also directed to a method for damping vibration in a machine having a beam being capable of gross motion in space relative to a stationary frame, means for causing the gross motion of the beam; the gross motion tending to induce vibration in the beam, and a work member mounted to the beam, the method comprising the steps of: providing a signal representative of the induced vibration in the beam, mounting a linear-acting inertial actuator to the beam, processing the signal and generating an output signal, and actively driving the linear-acting inertial actuator responsive to the output signal at the appropriate phase, frequency and magnitude to damp the beam's induced vibration. Embodiments of the method are directed towards damping vibrations in gantry robots, fluid dispensing machines, horizontal milling machines and pivoting robots.

The foregoing is illustrative of the present invention and is not to be construed as limiting thereof. Although several exemplary embodiments of this invention have been described, those skilled in the art will readily appreciate that many modifications are possible without materially departing from the novel teachings and advantages of this invention. For example, a linear-acting inertial actuator may be mounted along any axis where vibration is a problem, for example, for controlling vertical vibration along a Z axis or canted at some specific angle. Further, the inertial actuators may be mounted to the beam at any point where induced vibration may be damped thereby. Moreover, other control methods may be used which effectively damp the induced vibrations and other types of inertial actuators may be employed. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A vibration-damped machine, comprising:
   a beam being capable of gross motion in space relative to a stationary frame,
   a motor for causing said gross motion of said beam in at least one direction, said gross motion tending to induce vibration in said beam,
   a work member mounted to said beam,
   a sensor device for providing at least one signal representative of said induced vibration in said beam,
   at least one linear-acting inertial actuator mounted to said beam, wherein said at least one linear-acting inertial actuator comprises a plurality of inertial actuators each having a primary vibration axis, wherein said primary vibration axis of each of said plurality of inertial actuators are substantially orthogonal; and
   a controller for processing said at least one signal and generating at least one output signal to actively drive said at least one linear-acting inertial actuator in said at least one direction at the appropriate phase, frequency and magnitude to damp said induced vibration of said beam.

2. A vibration-damped machine of claim 1 wherein said sensor device comprises first and second sensors whose outputs are subtracted to provide a differential signal representative of said induced vibration.

3. A vibration-damped machine of claim 2 wherein said differential signal is further processed to provide a signal representative of vibrational velocity of said beam at a location of said first sensor.

4. A vibration-damped machine, comprising:
   a beam being capable of gross motion in space relative to a stationary frame,
   a motor for causing said gross motion of said beam in at least one direction, said gross motion tending to induce vibration in said beam,
   a work member mounted to said beam,
   a sensor device for providing at least one signal representative of said induced vibration in said beam, wherein said sensor device comprises first and second sensors whose outputs are subtracted to provide a differential signal representative of said induced vibration;
   at least one linear-acting inertial actuator mounted to said beam, and
   a controller for processing said at least one signal and generating at least one output signal to actively drive said at least one linear-acting inertial actuator in said at least one direction at the appropriate phase, frequency and magnitude to damp said induced vibration of said beam.

5. A vibration-damped machine of claim 4 wherein said differential signal is further processed to provide a signal representative of vibrational velocity of said beam at a location of said first sensor.

6. A vibration-damped machine, comprising:
   a beam being capable of gross motion in space relative to a stationary frame,
   a motor for causing said gross motion of said beam in at least one direction, said gross motion tending to induce vibration in said beam,
   a work member mounted to said beam,
   a sensor device for providing at least one signal representative of said induced vibration in said beam,
   at least one linear-acting inertial actuator mounted to said beam,
   a controller for processing said at least one signal and generating at least one output signal to actively drive said at least one linear-acting inertial actuator in said at least one direction at the appropriate phase, frequency and magnitude to damp said induced vibration of said beam, and
   wherein said at least one linear-acting inertial actuator is controlled responsive to a signal representative of a velocity differential between a first and a second signal derived from a first and second sensor.

7. A vibration-damped machine, comprising:
   a beam being capable of gross motion in space relative to a stationary frame,
   at least one intermediate frame member moveable with respect to said stationary frame, said beam being moveably mounted to said at least one intermediate frame member,
   wherein said at least one intermediate frame member comprises a first intermediate frame member mounted for orthogonal movement relative to a second intermediate frame member, said first intermediate frame member being moveably mounted to said stationary frame and said beam being moveably mounted to said second intermediate frame member,
   a motor for causing said gross motion of said beam in at least one direction, said gross motion tending to induce vibration in said beam,
   a work member mounted to said beam,
   a sensor device for providing at least one signal representative of said induced vibration in said beam,
   at least one linear-acting inertial actuator mounted to said beam, and
   a controller for processing said at least one signal and generating at least one output signal to actively drive said at least one linear-acting inertial actuator in said at least one direction at the appropriate phase, frequency and magnitude to damp said induced vibration of said beam.

8. A vibration-damped machine of claim 7 wherein said first intermediate member moves in a first direction, said second intermediate member moves in a second direction orthogonal to said first direction, and said beam moves in a third direction orthogonal to both said first and second directions.

9. A vibration-damped machine of claim 7 wherein said sensor device comprises first and second sensors whose outputs are subtracted to provide a differential signal representative of said induced vibration.

10. A vibration-damped machine of claim 9 wherein said differential signal is further processed to provide a signal representative of vibrational velocity of said beam at a location of said first sensor.

11. A vibration-damped machine, comprising:
   (a) a beam being capable of gross motion in space relative to a stationary frame,
   (b) means including a motor for causing said gross motion of said beam in at least one direction, said gross motion tending to induce vibration in said beam,
   (c) a work member mounted to said beam,
   (d) sensor means for providing at least one signal representative of said induced vibration in said beam,
   (e) at least one linear-acting inertial actuator mounted to said beam, and
   (f) control means for processing said at least one signal and generating at least one output signal to actively drive said at least one linear-acting inertial actuator in said at least one direction at the appropriate phase, frequency and magnitude to damp said induced vibration of said beam, the control means is configured to generate said at least one output signal based on an inertial damping control equation and wherein said at least one output signal actively drives said linear-acting inertial actuator to behave as though said linear-acting inertial actuator were a damper attached to ground.

12. A vibration-damped machine, comprising:
   (a) a stationary frame,
   (b) a first intermediate frame member moveable relative to said stationary frame member in a first direction,
   (c) a second intermediate frame member moveable relative to said first intermediate frame member in a second direction substantially orthogonal to said first direction,
   (d) a beam mounted for movement relative to said second intermediate frame member in a third direction substantially orthogonal to both said first and said second directions,
   (e) means including a motor for causing said movements in said first, second, and third directions, said movements tending to induce vibration within said beam,
   (f) a work member mounted to said beam,
   (g) sensor means for providing at least one signal representative of said induced vibration in said beam,
   (h) at least one linear-acting inertial actuator mounted to said beam, and
   (i) control means for receiving said at least one signal and generating at least one output signal to actively drive said at least one linear-acting inertial actuator at the appropriate phase, frequency and magnitude to damp said induced vibration of said beam.

13. A vibration-damped machine, comprising:
   (a) a beam being capable of gross motion in space relative to a stationary frame,
   (b) means including a motor for causing said gross motion of said beam in at least one direction, said gross motion tending to induce vibration within said beam,
   (c) a work member mounted to said beam,
   (d) sensor means for providing a signal representative of said induced vibration in said beam, said sensor means comprising a first acceleration sensor generating a first signal, a second acceleration sensor generating a second signal, said first and said second signal being subtracted to provide a differential acceleration signal and wherein said differential acceleration signal is integrated to provide a differential velocity signal,
   (e) at least one linear-acting inertial actuator mounted to said beam, and
   (f) control means for processing said differential velocity signal and generating at least one output signal to actively drive said at least one linear-acting inertial actuator at the appropriate phase, frequency and magnitude to damp said induced vibration of said beam.

14. A method for damping vibration in a flexible structure being capable of gross motion in space relative to a stationary frame wherein means for causing said gross motion of said flexible structure in at least one direction induces vibration in said flexible structure, the method comprising the steps of:
   (a) providing a signal representative of said induced vibration,
   (b) mounting an inertial actuator to said flexible structure at an attachment point,
   (c) processing said signal representative of said induced vibration according to an inertial damping control law and generating an output signal, and
   (d) actively vibrating said inertial actuator according to said output signal, said output signal actively driving said inertial actuator to behave as a damper connected between ground and said attachment point thereby damping said induced vibration.

15. A method for damping vibration in a flexible structure, comprising:
   (a) providing a signal representative of induced vibration in said flexible structure,
   (b) mounting an inertial actuator to said flexible structure at an attachment point,
   (c) processing said signal representative of induced vibration according to an inertial damping control law to generate an output signal, said output signal actively driving said inertial actuator to behave as a damper connected between ground and said attachment point, and
   (d) actively vibrating said inertial actuator according to said output signal thereby damping said induced vibration.

16. A vibration-damped machine, comprising:
   (a) a beam being capable of gross motion in space relative to a stationary frame,
   (b) means including a motor for causing said gross motion of said beam in at least one direction, said gross motion tending to induce vibration in said beam,
   (c) a work member mounted to said beam,
   (d) sensor means for providing at least one signal representative of said induced vibration in said beam,
   (e) at least one linear-acting inertial actuator mounted to said beam, and
   (f) control means for processing said at least one signal and generating at least one output signal to actively drive said at least one linear-acting inertial actuator in said at least one direction at the appropriate phase, frequency and magnitude to damp said induced vibration of said beam, wherein said control means is configured to generate said at least one output signal based on an inertial damping control equation and wherein said inertial damping control equation comprises:

$$\frac{F_a(s)}{V_s(s)} = \frac{(b_d - b_a)s^2 + \left(\frac{b_a b_d}{m_a} - k_a\right)s + \left(\frac{k_a b_d}{m_a}\right)}{s^2}$$

where:
   $m_a$ is a mass of a tuning mass of said at least one linear-acting inertial actuator,
   $k_a$ is a combined stiffness of springs supporting said tuning mass,
   $b_a$ is a damping coefficient of said tuning mass,
   $b_d$ is a desired damping coefficient of said beam,
   $F_a$ is a force acting on said tuning mass produced by energizing coils,
   s is a LaPlace frequency domain variable, and
   $V_s$ is a velocity of said beam.

\* \* \* \* \*